No. 826,793. PATENTED JULY 24, 1906.
A. F. MACK.
TRANSMISSION GEAR.
APPLICATION FILED FEB. 17, 1905.
2 SHEETS—SHEET 1.
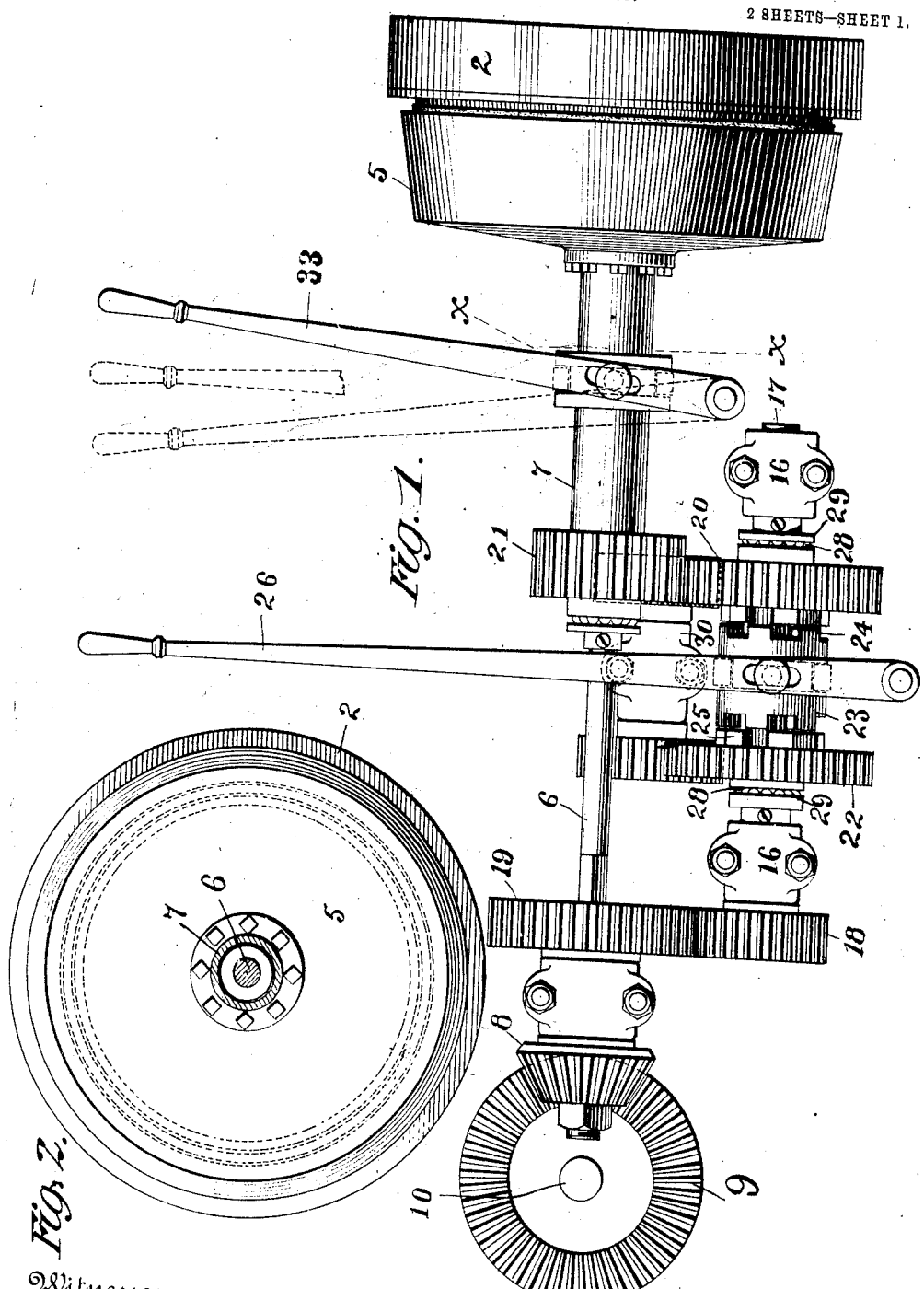

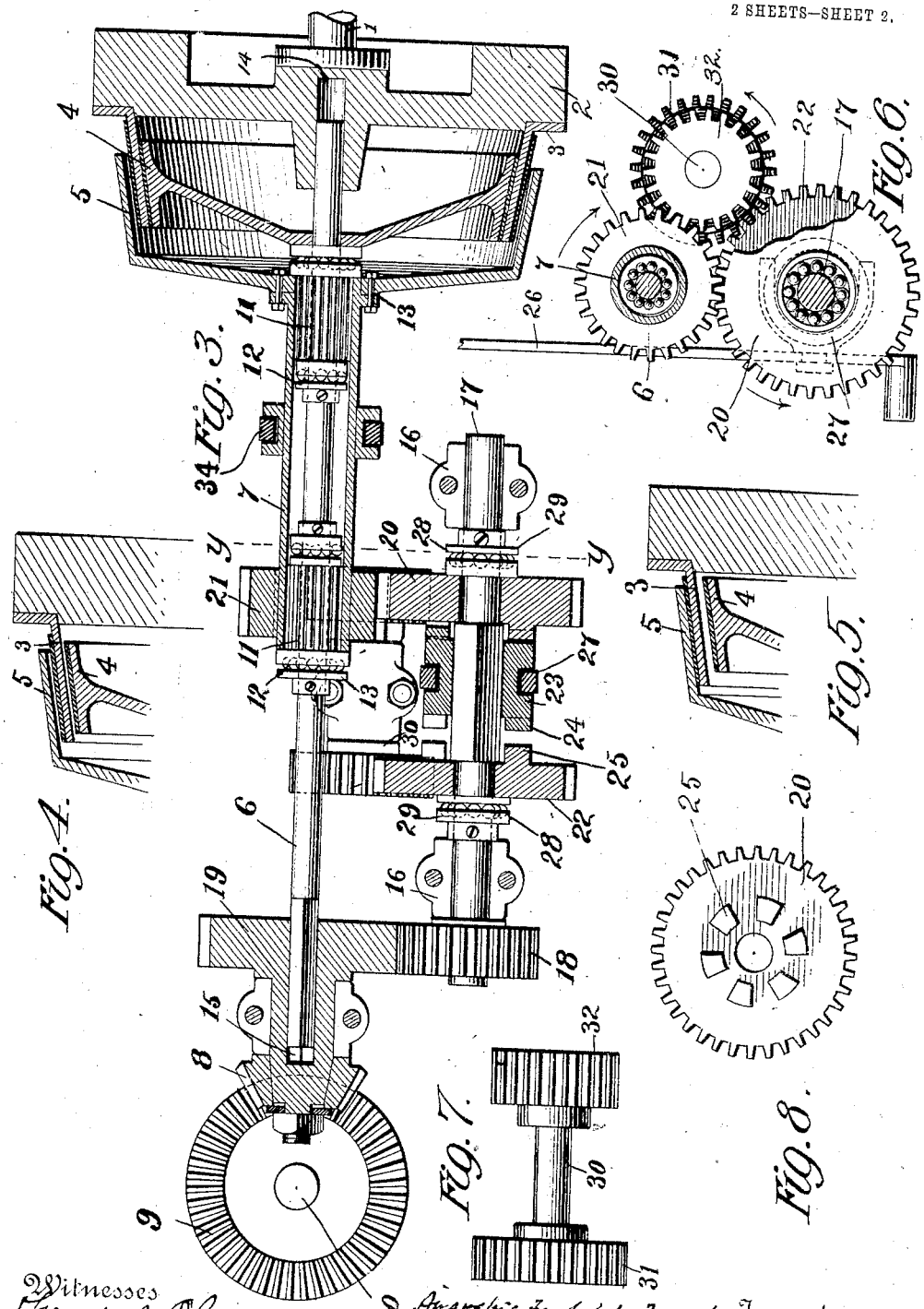

UNITED STATES PATENT OFFICE.

AUGUSTUS FREDERICK MACK, OF BROOKLYN, NEW YORK.

TRANSMISSION-GEAR.

No. 826,793.　　　　　Specification of Letters Patent.　　　Patented July 24, 1906.

Application filed February 17, 1905. Serial No. 245,991.

*To all whom it may concern:*

Be it known that I, AUGUSTUS FREDERICK MACK, a citizen of the United States, residing in the borough of Brooklyn, New York city, county of Kings, and State of New York, have invented certain new and useful Improvements in Transmission-Gear, of which the following is such a full, clear, and exact description as will enable any one skilled in the art to which it appertains to make and use the same, reference being had to the accompanying drawings, forming part of this specification.

The object of my invention is to provide a variable-speed transmission in which the use of sliding gears is avoided and the burring, stripping, and undue noise attending such use eliminated and, further, to produce a transmission mechanism which can be readily connected and disconnected from motor and that at the same time is certain in action, convenient in operation, and compact and strong in construction. To this end I mount upon a transmission-shaft carrying a pinion a sleeve or outer hollow shaft rotatable thereon and also carrying a pinion, both shafts being adapted to be alternately thrown in clutch with the driving-shaft of the motor, the pinions on the two shafts being further arranged to mesh, respectively, with pinion and gear-wheel on another shaft parallel therewith, so that power can either be imparted direct from the driving-shaft to the transmission-shaft, or for lower speed the transmission-shaft can be operated by the pinion on the parallel shaft as the latter shaft is rotated by its gear-wheel meshing with the pinion on the hollow shaft made to revolve by being brought in clutch in turn with the driving-shaft. For reversing I arrange an intermediate shaft carrying pinions, one of which meshes with the pinion on the outer hollow shaft and the other with a second gear-wheel mounted on the parallel shaft.

I accomplish the results in the manner and by the means to be now described by reference to the accompanying drawings, which illustrate one form and embodiment of the several features of my invention, and in which—

Figure 1 is a side elevation of a transmission mechanism embodying my invention. Fig. 2 is a view in cross-section on the line X X, Fig. 1. Fig. 3 is a view in vertical longitudinal section of the transmission mechanism, but with the relative position changed of certain of the movable parts. Figs. 4 and 5 are detailed sectional views showing the parts comprising friction-clutch in different positions. Fig. 6 is a view in cross-section with portions broken away on the line Y Y, Fig. 3. Fig. 7 is a detailed view of auxiliary shaft and pinions thereon. Fig. 8 is a view in elevation of gear-wheel, showing the projections which interlock with the sliding clutch.

In the drawings, 1 represents an engine or motor shaft upon which is mounted a power or fly wheel 2, provided with a conical flange 3, the faces of which furnish friction-surfaces for the rims of the inner and outer disks or wheels 4 and 5. The inner disk 4 is fitted upon a transmission-shaft 6, while the outer disk 5 is secured to a surrounding sleeve or hollow shaft 7. Upon the outer end of the shaft 6 is shown a bevel-pinion 8, meshing with bevel-gear 9, to drive a transverse shaft 10. Roller-bearings 11 11 and ball-bearings 12 12 permit the sleeve or hollow shaft 7 to rotate freely about the shaft 6, while relative motion lengthwise is prevented by the collars 13 13, and the two shafts have a uniform longitudinal movement as the transmission-shaft is drawn backward or forward in its bearings 14 and 15.

Suitably supported in bearings 16 16 is a parallel or counter shaft 17, at one end of which is a fixed pinion 18, which meshes with the fixed pinion 19 on the shaft 6. Upon the shaft 17 and mounted so that it may rotate thereon is a gear-wheel 20, meshing with a fixed pinion 21 on the hollow shaft or sleeve 7. The shaft 17 further carries a gear-wheel 22, which also may freely rotate thereon, and between the gear-wheels 20 and 22 is a sliding clutch 23, provided with teeth or projections 24 24, adapted to be projected into the interstices or spaces between the teeth 25 25 on the adjacent sides of the gear-wheels. The clutch 23, mounted on the square or rectangular portion of the shaft 17, with which it rotates, is moved back and forth by the lever 26 through the yoke 27 to engage either gear-wheel, as described. Antifriction-bearings 28 28 are shown as interposed to take the thrust against the collars 29 29.

Between the transmission-shaft 6 and the counter-shaft 17 is conveniently mounted in suitable bearings an auxiliary or intermediate shaft 30, on one end of which is a fixed pinion 31, which meshes with the gear-wheel 22, and at the other end a pinion 32, which is in mesh with the pinion 21 on the hollow shaft or sleeve 7. The pinion 21 is shown as of an increased width or thickness to allow for the longitudinal movement of the hollow shaft or sleeve 7, to which it is secured, and to keep in mesh the full faces of the gear-wheel 20 and pinion 32.

When the operating lever 33, connected by yoke 34 to the hollow shaft 7, is put in the position shown in Fig. 1, the transmission-shaft 6, being at the same time brought forward in its bearings, the frictional surface of the outer disk 5, carried on the shaft or sleeve 7, is held against the outer surface of the conical flange of the fly-wheel. The sleeve or hollow shaft 7, thus brought in frictional clutch with the engine or motor, is revolved upon its bearings with its pinion 21. This pinion, meshing with the gear-wheel 20, held from independent rotation by the clutch 23, turns the shaft 17 and the pinion 18, mounted upon it. The pinion 18, meshing with pinion 19, rotates the bevel-pinion 8 and bevel-gear 9 and imparts power to the transverse shaft 10. The machine is now started at slow speed.

After the machine has been set in motion and increased speed is desired the lever 33 is thrown back into the farthest position indicated by the dotted lines in Fig. 1. By this movement of the lever the shaft 6 is forced backward in its bearings, the outer disk 5 drawn away, and the inner disk 4, mounted on the transmission-shaft 6, thrown in clutch with the fly-wheel. Power is then directly transmitted through shaft 6 by bevel-pinion 8 and bevel-gear 9 to the transverse shaft 10.

When the machine is running at full speed on the direct drive, the lever 26 may be put in position shown in Fig. 1. The clutch 23 then becomes disengaged on both sides and the gear-wheels 20 and 22 will run free, or the clutch may remain in engagement with the gear-wheel 20, as shown in Fig. 3, and the hollow shaft 7 retained in rotation. When but two speeds are provided for and no provision made for reversing, the gear-wheel 20 may be rigidly secured to its shaft and the sliding clutch dispensed with.

To reverse, the sliding clutch 23 is thrown into engagement with the gear-wheel 22 and the outer disk 5 brought in clutch with the fly-wheel, thereby rotating the hollow shaft 7 with its fixed pinion 21. The pinion 21, meshing with the pinion 32, will rotate in the opposite direction the auxiliary shaft 30, carrying pinion 31. The pinion 31, meshing with the gear-wheel 22, held from independent rotation by the clutch 23, will impart to the shaft 17 a movement in the same direction as that of the fly-wheel of the engine. Then the pinion 18, which is secured to the shaft 17, meshing with the pinion 19 on the shaft 6, will turn the latter backward, and through the bevel-pinion 8 and bevel-gear 9 a reverse movement is imparted to the transverse shaft 10. By bringing the lever 33 to an intermediate or perpendicular position disks 4 and 5 may both be held from contact with the flange of the fly-wheel, in which position the entire transmission mechanism is out of clutch and the engine runs free.

Attention is called to the fact that the gear-trains, which transmit motion from the driving-pinion 21, are non-slidably supported and that means are provided for transmitting motion from said pinion to either of said gear-trains at will. Thus when the clutch 23 is thrown into engagement with the gear 20 the rotary motion of the driving-pinion 21 is transmitted through the gear 20, gear 18, gear 19, and bevel-gears 8 9 to the shaft 10. On the other hand, when the clutch 23 is moved into engagement with the gear 22, motion is then transmitted from the pinion 21 to the gear 32, gear 31, pinion 22, and so as before from gear 18 to shaft 10. It will also be apparent that the construction of the last-named gear-train is such as to transmit the motion of the pinion 21 at a different rate of speed from that of the first-named gear-train.

In another application for Letters Patent, Serial No. 265,161, filed June 14, 1905, I have claimed the combination, in a friction-clutch mechanism, of a driving member, a support therefor, two driven members disposed respectively on opposite sides of said driving member, means for supporting said driven members independently of said driving-member support, and means for moving either of said driven members into engagement with said driving member, together with the specific construction of the clutch mechanism herein described.

What I claim, and desire to secure by Letters Patent, is—

1. In a transmission-gear, the combination with a motor-shaft and a wheel mounted thereon provided with conical frictional surfaces, of a transmission-shaft, a disk on the transmission-shaft provided with a conical frictional surface, a hollow shaft or sleeve rotatively mounted on said transmission-shaft, a disk on the hollow shaft provided with a conical frictional surface and having its rim surrounding the rim of the disk on said transmission-shaft, and means for bringing the frictional surfaces of the disks of the transmission and hollow shafts alternately in contact with the frictional surfaces of the motor-wheel.

2. In a transmission-gear, the combination with a motor-shaft and a wheel mounted thereon provided with conical frictional surfaces, of a transmission-shaft, a disk on the transmission-shaft provided with a conical frictional surface, a hollow shaft rotatively mounted on said transmission-shaft and secured from independent longitudinal movement thereon and a disk thereon having a conical frictional surface and having its rim surrounding the rim of the disk on said transmission-shaft, means for reciprocating the transmission-shaft in its bearings and bringing the frictional surfaces of the disks of the transmission and hollow shafts alternately in contact with the frictional surfaces of the motor-wheel, a driven member and means for transmitting power from said hollow shaft to said driven member.

3. In a transmission-gear, the combination with a motor-shaft, of a transmission-shaft, a pinion thereon, a hollow shaft rotatively mounted on said transmission-shaft, a pinion on said hollow shaft, means for alternately clutching the transmission-shaft and hollow shaft with the motor-shaft, a parallel shaft, a pinion thereon meshing with the pinion on the hollow shaft, a gear-wheel mounted on the parallel shaft, an auxiliary shaft, and pinions on said auxiliary shaft meshing respectively with the gear-wheel on parallel shaft and pinion on hollow shaft.

4. In a transmission-gear, the combination with a motor-shaft a wheel mounted thereon provided with a conical flange, of a transmission-shaft, a disk on said transmission-shaft provided with a conical flange or rim, a hollow shaft rotatively mounted on said transmission-shaft and secured from independent longitudinal movement thereon, and a disk thereon having a conical flange, means for reciprocating the transmission-shaft in its bearings and alternately bringing the inner surface of the flange on the hollow shaft in contact with the outer surface of the flange of the wheel of the motor and the outer surface of the rim of the wheel on the transmission-shaft with the inner surface of the flange on the motor-wheel and in turn holding the frictional surfaces of both disks free from the motor-wheel.

5. In a transmission-gear, the combination with a motor-shaft, of a transmission-shaft, a pinion thereon, a hollow shaft or sleeve rotatively mounted on said transmission-shaft and a pinion thereon, means for alternately clutching the transmission-shaft and hollow shaft with the motor-shaft, a parallel shaft, a pinion on the parallel shaft meshing with pinion on the hollow shaft, gear-wheels rotatably mounted on said parallel shaft and an intervening sliding clutch to hold either wheel from rotation, an intermediate shaft, pinions on said intermediate shaft meshing respectively with a gear-wheel on the parallel shaft and pinion on the hollow shaft.

6. A driving-shaft, a separately-supported driven member, transmission-gearing interposed between said shaft and member comprising clutches between said gearing and said driving-shaft for varying the speed of transmitted motion, and a clutch for reversing the direction of transmitted motion.

7. A rotary shaft, a sleeve thereon, means for rotating said shaft or said sleeve, a separately-supported driven member operatively connected to said shaft and means for transmitting to said driven member motion from said sleeve independently of said shaft.

8. A rotary shaft, a sleeve thereon, means for rotating said shaft or said sleeve, a separately-supported driven member operatively connected to said shaft, means for transmitting to said driven member motion from said sleeve independently of said shaft and means for reversing the motion transmitted from said sleeve.

9. A rotary shaft, a sleeve thereon, means for rotating said shaft or said sleeve, a separately-supported driven member operatively connected to said shaft, and means for transmitting motion at a relatively lower speed from said sleeve to said member independently of said shaft.

10. An axially-movable rotary shaft, a sleeve thereon, means for rotating said shaft or said sleeve, a separately-supported rotary driven member operatively connected to said shaft, whereby rotary motion only is transmitted from said shaft to said member, and means for transmitting rotary motion from said sleeve to said driven member independently of said shaft.

11. A rotary shaft, a sleeve thereon, means for rotating said shaft or said sleeve, a separately-supported rotary driven member operatively connected to said shaft, transmission-gearing interposed between said sleeve and said driven member and comprising a clutch mechanism for reversing the direction of motion transmitted thereby.

12. In combination with a driving-shaft, a loose sleeve thereon, means for rotating said shaft or said sleeve, and a separately-supported rotary driven member operatively connected to said shaft, motion-transmitting gearing constantly in mesh interposed between and engaging directly with said driven member and with said sleeve, comprising means for interrupting at will the transmission of motion by said gearing.

13. In combination with a driving-shaft, a loose sleeve thereon, means for rotating said shaft or said sleeve, and a separately-supported rotary driven member operatively connected to said shaft, motion transmitting-gearing constantly in mesh interposed between and engaging directly with said driven member and said sleeve comprising means for reversing the direction of motion transmitted by said gearing.

14. In combination with a driving-shaft, a loose sleeve thereon, means for rotating said shaft or said sleeve, and a separately-supported rotary driven member operatively connected to said shaft, toothed gears respectively on said sleeve and on said driven member and intermediate toothed gears; said gears having their teeth constantly in engagement and one of said intermediate gears being loose on its shaft; and a clutch for connecting said loose gear to said shaft.

15. The combination of a driven member, a transmission-shaft having one end slidably connected thereto, a sleeve non-slidably supported on said transmission-shaft, gearing between said sleeve and said member, a driving member, and means for moving said sleeve and said transmission-shaft jointly to bring one or the other at will into operative connection with said driving member.

16. The combination of a driven member, a transmission-shaft having one end slidably connected thereto, a sleeve non-slidably supported on said transmission-shaft, gearing between said sleeve and said member, comprising means for reversing the motion imparted through said gearing from said sleeve to said member, a driving member, and means for moving said sleeve and said transmission-shaft jointly to bring one or the other at will into operative connection with said driving member.

17. In a transmission-gear, the combination with a motor-shaft, of a separate transmission-shaft having its axis in prolongation of the axis of said motor-shaft, a hollow shaft rotatably mounted on said transmission-shaft, and secured from independent longitudinal movement thereon, a clutch mechanism, and means for reciprocating the transmission-shaft in its bearings and thereby alternately bringing the hollow shaft and the transmission-shaft in clutch with the motor-shaft.

In testimony whereof I have hereunto set my hand in the presence of the two subscribing witnesses.

AUGUSTUS FREDERICK MACK.

Witnesses:
   C. J. HEERMANCE,
   A. M. HAYES.